March 31, 1970 F. V. BELLIS 3,504,133
INDEXING MEANS FOR MULTI-TRACK MAGNETIC
TAPE REPRODUCING APPARATUS
Filed July 26, 1965 2 Sheets-Sheet 1

Frederick V. Bellis
INVENTOR

BY

Lawrence E. Laubscher
ATTORNEY

March 31, 1970 F. V. BELLIS 3,504,133

INDEXING MEANS FOR MULTI-TRACK MAGNETIC TAPE REPRODUCING APPARATUS

Filed July 26, 1965 2 Sheets-Sheet 2

Frederick V. Bellis
INVENTOR

BY

Lawrence E. Laubscher
ATTORNEY 3,504,133

INDEXING MEANS FOR MULTI-TRACK MAGNETIC TAPE REPRODUCING APPARATUS

Frederick Victor Bellis, Carshalton Beeches, England, assignor to Clarke & Smith Manufacturing Company Limited Filed July 26, 1965, Ser. No. 474,623
Claims priority, application Great Britain, July 24, 1964, 29,794/64
Int. Cl. G11b 5/02
U.S. Cl. 179—100.2 4 Claims

ABSTRACT OF THE DISCLOSURE

Magnetic tape recording and reproducing apparatus and method for use in connection with multi-track tape at least one track of which is an intelligence track recorded at one effective recording speed, and at least one other track of which is an indexing signal recorded at a higher playback speed, whereby during the high-speed rewind operation, the indexing signal may be utilized to afford an instantaneous indication of the position of the head relative to the tape. The invention is characterized by the provision of cam-operated indexing means for shifting a magnetic playback head transversely of the tape between positions associated with the various tracks, respectively.

This invention relates to indexing magnetic tape records. Though not limited in its application to such apparatus, the invention is particularly suited for use in connection with so-called talking books, for use by the blind. Talking books using magnetic tape have the advantage of a long playing time but this makes it more difficult for the user to find a particular part of the recording. This is especially a problem with recorded text books, where the user may require to select a particular passage of the complete recording, for reference purposes. The present invention is concerned with indexing by which a user may rapidly find a part of a recording.

The invention provides a magnetic tape record on which a first signal is recorded in a plurality of parallel spaced tracks, said first signal being intelligible on playing back said tracks in succession with said tape being fed at a tape playback speed and on which an indexing signal is recorded in an indexing track disposed between adjacent tracks of said plurality, said indexing signal being audibly intelligible on playing back said indexing track with the tape being fed at a tape spooling speed substantially higher than said tape playback speed.

Another aspect of the invention provides a method of producing a magnetic tape record in which a signal is recorded at one effective recording speed in a plurality of spaced parallel tracks on the tape, and an indexing signal is recorded on the tape at a substantially higher effective recording speed in at least one indexing track spaced from the tracks of said plurality.

Yet another aspect of the invention provides in a magnetic tape apparatus for use in conjunction with a magnetic tape record on which a first signal for playback at a playback tape speed is recorded in a plurality of parallel spaced tracks and an indexing signal for playback at a tape spooling speed is recorded in at least one indexing track disposed between adjacent tracks of said plurality; said machine comprising a transducer head, means for guiding the tape in a transducing path beside said head, drive means for driving the tape along said path substantially at said playback speed, and spooling drive means for driving the tape substantially along said path at a spooling speed substantially higher than said first speed; a mount for said head comprising track selection means for providing controlled movement of said head in a direction transverse to said path for selection of one track from said plurality and comprising a manually operable member for displacing the head in said direction to a position for alternatively selecting an indexing track, and guide means for guiding movement of the head in said direction.

By the term "magnetic tape apparatus" used in this specification is meant apparatus for recording on magnetic tape, or playing back magnetic tape, or both; the term "transducer head" is meant to include a recording head and a playback head and a combined record and playback head.

Other features and advantages of the invention will appear from the following description of an embodiment thereof, given by way of example in conjunction with the accompanying drawings; in which.

Figure 1:
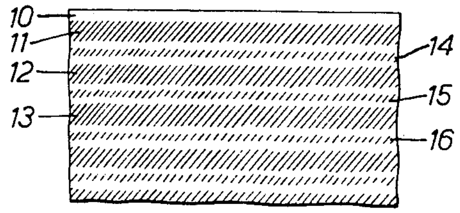
FIGURE 1 is a fragmentary diagram of a portion of recorded magnetic tape, showing a suitable form of track disposition for use in accordance with the invention.

The head assembly shown in the drawings is intended for use with a magnetic tape recording of the kind which is currently used with talking books, consisting of a magnetic tape having a width of 0.500". The number of tracks used on such a tape is not standardized, but in one arrangement 15 tracks are recorded, having a width of approximately 0.015", with a guard space between adjacent tracks of 0.015". FIGURE 1 shows a fragment of such a tape; the tape 10 has a spoken recital, for instance of a book recorded on it in parallel tracks 11, 12, 13, etc.; it will be appreciated that such tracks will not be visible on the tape itself. The recording speed may be uniform along the length of the tape, or as with the present practice, the tape may be driven at a varying speed along its length, averaging one or two inches per second. For convenience of the user, the talking book machine has a fast wind device, when the speed is advanced at about ten times its playing speed.

In accordance with the invention, an index track is recorded in the guard space between adjacent recital tracks such as 11 or 12, such index tracks being indicated diagrammatically at 14, 15, 16, etc. in FIGURE 1. The index tracks are less than the width of the guard spaces and a convenient width is 0.005". Further, the index track will be a recording of suitable index information, such as a spoken announcement of numbers corresponding to page numbers, paragraph numbers, or the like, and this information is recorded at a much higher effective recording speed, corresponding to the fast spooling speed of the reproducing machine. When the user wishes to find a particular passage in the recording, for example as indicated by an index in Braille, the playback head is moved to scan the index track such as 14, 15, 16, etc. and the machine set to the fast feeding speed. As the tape is thus advanced at high speed an intelligible reproduction will be afforded the user, indicating the position of the main recording. The same playback head of the machine can be used to scan both the index tracks and the recital tracks alternatively.

Figure 3:
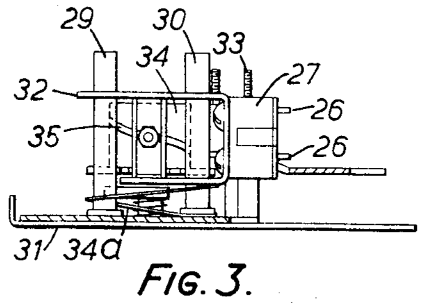
FIGURE 3 is a fragmentary sectional view taken on the line 3—3 of FIGURE 2.
Figure 4:
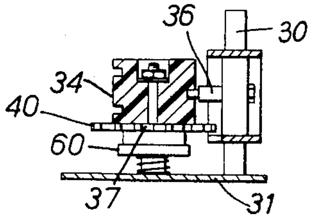
FIGURE 4 is a further sectional view taken on the line 4—4 of FIGURE 2.
Figure 2:
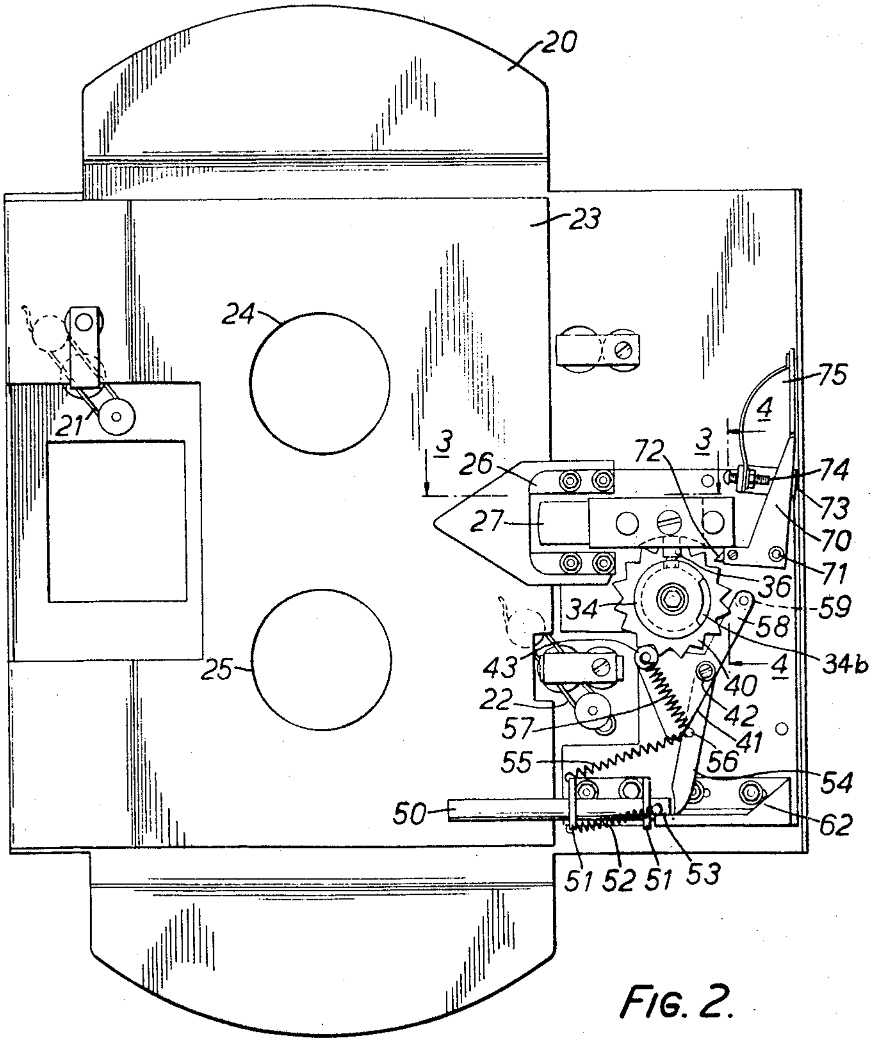
FIGURE 2 is a plan view, with the cover removed, of a head assembly in accordance with the invention.

FIGURES 2, 3 and 4 are views of part of a talking book machine, by which the present invention can be carried into effect. It will be understood that the remaining parts of the machine, including the tape driving mechanism and the electronic and reproducing means can be of conventional construction.

The apparatus shown comprises a base plate 20, formed of sheet metal, which fits on top of the tape deck of the talking book apparatus; the base carries spring clips 21, 22, to enable it to be detachably fastened to the apparatus. A platform 23 is secured above and parallel to the base plate. The base plate normally carries a cover, not shown, to form a receptacle for a magnetic tape cassette, including two spools, also not shown, the arrangement being such that when the cassette is in position the spools are driven on spindles passing through openings 24, 25, in the base plate and platform.

Tape passing from one to the other of the spools is guided by means of upper and lower guide fingers 26, past a magnetic reproducing head 27. The head 27 can be moved vertically so that the narrow gap in the head can be brought to register with the tracks recorded on the tape. A vertically movable head carriage is provided by means of two posts 29 and 30, fastened to sub-assembly plate 31, upon which is mounted the carriage 32 consisting of a metal strip bent to U-shape. The arms of the U are pierced and passed over the posts 29 and 30, and the head is attached to the base of the U by means of screws 33. A hairpin spring **34*a* biases the carriage upwardly but the vertical position of the carriage is determined by means of a cam groove member 34. Cam member 34 has in it a cam groove 35, which is helical, and the carriage has a projecting cam follower 36, the tip of which enters the cam groove 35. The member 34 can rotate upon a spindle 37 fastened in the sub-assembly plate 31 and as the cam member 34 is rotated, the carriage 32, and with it head 27, will be moved vertically to a predetermined position depending upon the angular position of member 34**.

An indexing mechanism is provided for member 34. As shown, this comprises a star wheel 40, rigidly fixed to the member 34, and a detent roller plate 41, pivoted on a short pillar at 42, fastened to sub-assembly plate 31. Plate 41 carries a detent roller 43, which is located so as to drop into one of the detents of the star wheel 40. The plate 41 is spring-biased in the clockwise direction, so that roller 43 is biased into a detent of star wheel 40. The star wheel has sixteen teeth, corresponding to fifteen vertical positions of head 27 and a sixteenth position which is a homing position for the head. In this last position the cam follower 36 is arranged to enter a longitudinal slot **34*b* in the surface of the cam member 34, joining the ends of the one turn helical cam groove, so that under the action of the return spring 34*a*** the carriage will tend to move to the uppermost position when the cam follower encounters the longitudinal groove.

The head is arranged to move to its uppermost position in this way when a cassette is inserted in the machine. When this is done, the cassette is arranged to move in actuating rod 50, mounted in the arms of a guide plate 51, the rod being biased to one limit of its movement by a spring 52, its movement being limited by a cross-pin 53. A lever 54, the end of which is pivoted on the pillar at 42, extends into the path of the cross pin 53. A tension spring 55 extends between the guide plate 51 and an attachment point 56 on lever 54 and a further and stronger spring 57 extends from the point 66 to a projection on roller 43. When the rod 50 is moved endwise on insertion of a cassettee, the cross pin 53 engages the end of lever 54 and causes it to pivot in an anticlockwise direction, as seen in FIGURE 2, thereby releasing roller 43 from engagement with the star wheel. By this same movement a tail 58, forming part of plate 41, and carrying on its underside a small projection 59, is moved into engagement with a cardioid cam 60 attached to the underside of star wheel 40. Thereby, the star wheel, now freed of detent 43, is moved by the projection 59 to the position in which the vertical groove in the cam face permits the cam follower to move vertically, thus permitting the head 27 to come to its uppermost position. The spring 57 enables lever 54 and plate 41 to move relatively, and to yield if any excessive pressure should be produced during this operation.

The rod 50 will be in the innermost position when the cassette is in operating position on the machine, and so that the detent mechanism can be restored to operation, means are provided to disconnect rod 50 from lever 54. For this purpose guide plate 51 is also formed with a cam surface 62, against which the top end of cross pin 53 is held by the tension of spring 52. As the rod approaches the innermost limit of its travel the upper end of the cross pin will engage the cam surface 62, causing the rod 50 to rotate about its longitudinal axis, and thereby releasing the lower part of cross pin 53 from engagement with lever 54. Thereupon the lever moves under the tension of spring 55 to the position shown in FIGURE 2.

Means are provided for changing the vertical position of head 27 step by step, to reproduce from the successive recorded tracks on the tape. For this purpose there is provided a lever 70, pivoted at 71 to the sub-assembly plate 31, and carrying at its tip a spring-loaded pawl 72 which is arranged to project into the path of star wheel 40, and to advance it one tooth position each time lever 70 is moved. The lever 70 moves between a fixed abutment 73 and an adjustable abutment 74 and is spring biased by a flat leaf spring 75. The end of lever 70 may be actuated by a solenoid controlled by a control signal recorded at the end of each track of the tape.

As thus far described, the apparatus can be used to reproduce from a conventionally recorded tape, and to allow the head 27 to be moved to a monitoring position to reproduce from the index track, such as 14, 15, etc., it is arranged that the head has a further degree of vertical movement. This is very simply provided merely by arranging that the cam follower 36 fits within the groove of the cam member 34 with a small tolerance of approximately 0.015″. Normally the hairpin spring **34*a* biases the cam follower 36 so that it bears against the upper edge of the groove in the cam member, but if the head carriage 32 is depressed, the carriage can be moved downwardly against the tension of the spring, until the cam follower bears against the lower edge of the cam groove. It is arranged that in this position the head will read from the index track. Thus, the user can set the controls of the apparatus to fast wind and by depressing the carriage 32** by a suitable control member, not shown, the index track will be read. It may be that the head will scan part of the normal track when reproducing the index track, but owing to the very great difference in recording speeds intelligibility is not affected. If through slight displacement of the head the index track is scanned during normal use, the index signal will be reproduced at so low a frequency as not to be efficiently amplified by a suitable reproducing amplifier, so that interference is minimised.

While the embodiment of the invention described is of a complete apparatus, the sub-assembly can also be used to modify an existing talking book apparatus.

One convenient method of producing large numbers of the tape records begins by the direct recording in a single track on standard master tape of the recital. This recording is then transferred to a master cassette, where the recital is sectionalized into the appropriate number of tracks (in the present instance, fifteen). The master cassette may then be used to generate copy cassettes, and for this purpose the master and copy cassettes can be placed in a high speed copying machine which feeds the cassette tapes at similar high speeds past playback and record heads respectively. A signal picked up from the master cassette is re-recorded on the copy cassette. Separate heads are provided for each track of the cassettes, so that all tracks are recorded simultaneously.

The indexing signal may be inserted in several ways. For instance, the appropriate passages of the recital may be collated with the corresponding physical part of the original master recording (identified for instance by the number of spool revolutions from the end of the tape), and the tape run through again at a suitable high speed while announcements are recorded as a second track of the master tape, at the appropriate part of the tape. The indexing announcements may for instance refer to the page numbers or chapters and paragraphs, of a book if this is what is recorded by the recital, and will slightly precede the actual position of the corresponding passage of the recital so that when the copy tape is played back by the user he will arrest the spooling of the tape at the right passage. The indexing announcements may be recorded both forwards and backwards so as to provide intelligible indexing whether the user is spooling the copy cassette forwards or backwards. With this method the indexing track may be transferred to the master cassette simultaneously with the main recital by use of separate heads. The indexing signals could be recorded directly onto the master cassette. In either of these methods, separate heads are preferably provided in the high speed copying machine to transfer the indexing track from the master cassette to the copy cassettes simultaneously with the main recital.

Another method of providing indexing signals, of a different type, is suitable where the user wishes to mark certain passages of the recital for future reference. Provision may be made in the user's playback apparatus for recording a suitable tone in the indexing track of the tape while the user is playing the recording at normal playback speed. This tone will then appear at a considerably higher frequency when the tape is spooling at high speed, if the index track is selected by depressing the head of the playback machine described above.

In the playback machine, the playback head may be used to record the indexing tone. One suitable means for accomplishing this is to provide a record button for switching an alternating signal, for instance at mains frequency, onto the windings of the playback head. No bias signal is necessary, and no record amplifier need be provided. A safety device could be used so that the indexing tone could not be recorded into the main recital track.

I claim:

1. In a magnetic tape reproducing apparatus adapted for use in connection with a multi-track tape record and including drive means for transporting the tape along a given path alternately at a lower playback speed and at a higher rewind speed, respectively, at least a first track on said tape comprising an intelligence signal recorded at the tape playback speed and at least a second track comprising an indexing track parallel with and spaced from said first track, said indexing track being recorded at the higher rewind speed, the invention which comprises stationary guide post means arranged to extend transversely of the tape;
  - transducer head means mounted for reciprocatory sliding movement on said guide post means;
  - first selection means for positioning said transducer head means at a first position on said guide means to reproduce information recorded on said first track during the transport of the tape at said playback speed, said first selection means comprising rotary cam means including a cylinder rotatable about an axis parallel with said guide post means and having on its outer periphery a helical cam groove, and a cam follower member connected with said transducer head means and extending into said cam groove;
  - second selection means for positioning said transducer head means at a second position on said guide means to reproduce the indexing information during the transport of the tape at said rewind speed;
  - and spring means biasing said transducer head means on said guide post means in the direction from said second position toward said first position.

2. Apparatus as defined in claim 1, and further wherein the width of said helical groove is greater than the corresponding dimension of said follower member to permit shifting of said transducer means on said guide post means from the first position to the second position while the cam means is maintained stationary.

3. Apparatus as defined in claim 1 wherein said tape includes a plurality of parallel pairs of said first and second tracks, and further including indexing means for rotatably stepping the cylinder between angular positions in which said transducer head is opposite successive ones of said first tracks, respectively.

4. Apparatus as defined in claim 3, wherein said indexing means includes a star wheel (40) connected with said cylinder, detent means (43) cooperating with said star wheel to step said cylinder between the indexing positions, means (50, 54) for releasing said detent means from said star wheel, and means including a longitudinal slot (34*b*) in said cylinder for returning said transducer head means to an initial position upon release of said detent means from said star wheel.

References Cited

UNITED STATES PATENTS

| | | | |
|---|---|---|---|
| 2,468,198 | 4/1949 | Heller | 179—100.2 |
| 2,422,143 | 6/1947 | Somers et al. | 179—100.2 |
| 2,857,164 | 10/1958 | Camras | 179—100.2 |
| 3,048,083 | 8/1962 | Rosenbaum | 179—100.2 |
| 3,056,302 | 10/1962 | Proctor | 179—100.2 |
| 3,166,328 | 1/1965 | Roberts | 179—100.2 |

FOREIGN PATENTS

| | | |
|---|---|---|
| 810,111 | 5/1955 | Great Britain. |

BERNARD KONICK, Primary Examiner

JEROME P. MULLINS, Assistant Examiner

U.S. Cl. X.R.

274—4